United States Patent [19]

Makarov

[11] Patent Number: 4,498,357

[45] Date of Patent: Feb. 12, 1985

[54] MASS ACCELERATOR AND POWER CONVERTER UNIT

[76] Inventor: George Makarov, 30205 Summit Dr., Apartment 201, Farmington Hills, Mich. 48018

[21] Appl. No.: 421,612

[22] Filed: Sep. 22, 1982

[51] Int. Cl.³ .................... F16H 3/74; F16H 33/02; F16H 1/28
[52] U.S. Cl. .................................... 74/752 F; 74/64; 74/802
[58] Field of Search ............ 290/1 C; 310/80, 83; 74/752 F, 752 R, 752 E, 751, 750 R, 793, 796, 797, 798, 801, 690, 64, 84 R, 802

[56] References Cited

U.S. PATENT DOCUMENTS

| | | | |
|---|---|---|---|
| 1,461,559 | 7/1923 | Reece et al. | 74/752 F |
| 1,791,386 | 2/1931 | Sprigg | 74/752 F |
| 1,812,176 | 6/1931 | Sheridan | 74/752 F |
| 2,077,556 | 4/1937 | Gaston | 74/752 F |
| 2,149,560 | 3/1939 | Teece et al. | 74/751 |
| 3,889,554 | 6/1975 | Sinclair et al. | 74/798 |
| 3,960,036 | 6/1976 | Moller | 74/752 FX |

FOREIGN PATENT DOCUMENTS 2612035  9/1977  Fed. Rep. of Germany .... 74/752 F

*Primary Examiner*—Leslie A. Braun
*Assistant Examiner*—Arthur T. Quiray
*Attorney, Agent, or Firm*—Brooks & Kushman

[57] ABSTRACT

A mass accelerator and power converter unit is disclosed which utilizes centrifugal force generated by rotating masses which, when rotated within their respective cylindrical housings, exert pressure on the inner curved surfaces of the housings and roll thereon. The unit includes a wheel which interconnects each of the housings and which functions as a torque wheel to provide torque amplification. A drive mechanism, including a battery-operated electric motor causes the masses to rotate in synchronism within their associated housings. A driven mechanism including a ring gear mounted on the wheel is provided to facilitate the withdrawal of energy from the unit.

20 Claims, 5 Drawing Figures

4,498,357

MASS ACCELERATOR AND POWER CONVERTER UNIT

TECHNICAL FIELD

This invention relates to mass accelerator and power converters and, in particular, to mass accelerator and power converters which utilize rotating masses to amplify torque.

BACKGROUND ART

Various patents disclose apparatus and systems for storing energy and converting power from one form into another. For example, the U.S. Pat. No. 3,970,917 to Diggs discloses a system for storing energy and converting DC power to AC power. The system includes a flywheel which is mounted in an evacuated housing and is driven by a plurality of wheels powered by DC electric motors which receive current from a DC input power source. A number of wheels are coupled to AC generators which selectively engage the rotating flywheel to withdraw energy from the rotating mass of the flywheel in the form of alternating current.

Various prior art patents utilize a flywheel to provide extra power on a standby basis. Examples of such systems include U.S. Pat. Nos. 3,558,901, to Jacobus, 3,477,013, Smith 4,027,485 Wallis, and 3,296,451 Van Ausdal.

Other engines generally of the type to which this invention relates are disclosed by the U.S. Pat. Nos. of 3,364,787, Miller, 2,301,424, List, 2,672,566 Heins and 4,218,624 Schiovanne.

DISCLOSURE OF THE INVENTION

An object of the present invention is to provide an improved device for amplifying torque and converting power from one form to another.

Another object of this invention is to provide a device for utilizing the energy developed by rotating and rolling masses within a plurality of cylindrical housings as a source of power.

A further object of the invention is to provide an improved mass accelerator and power converter device, including substantially identical rotating masses which rotate in unison in the same direction about their auxiliary axes and which also rotate about a main axis parallel to the auxiliary axes, which are also equidistantly spaced from the main axis and from each other.

In carrying out the above objects and other objects of this invention, a preferred embodiment of the invention includes a support structure, a plurality of cylindrical housings and a like plurality of masses, each of which is rotatably mounted in its respective cylindrical housing to rotate about its respective auxiliary rotational axis. When rotated, the masses engage inner curved surfaces of the cylindrical housings. A wheel is rotatably mounted on the support structure for rotating about a main rotational axis spaced apart from each of the plurality of auxiliary axes. The wheel interconnects the cylindrical housings to permit the housings to rotate in unison about the main axis upon rotation of the masses. A drive means is coupled to each of the masses for supplying rotational power to each of the masses. A driven means is coupled to the wheel for withdrawing rotational power from the wheel as the wheel rotates upon rotation of the masses within their respective housings.

Preferably, each of the housings has a curved inner surface and wherein each of the masses is rotatably mounted to the drive means to roll on the inner surface of its respective housing.

Also, preferably a flywheel mechanism and a braking mechanism are coupled to the wheel to stabilize rotation of the wheel and prevent rotation of the wheel in one direction, respectively.

BEST MODE FOR CARRYING OUT THE INVENTION

Figure 1:
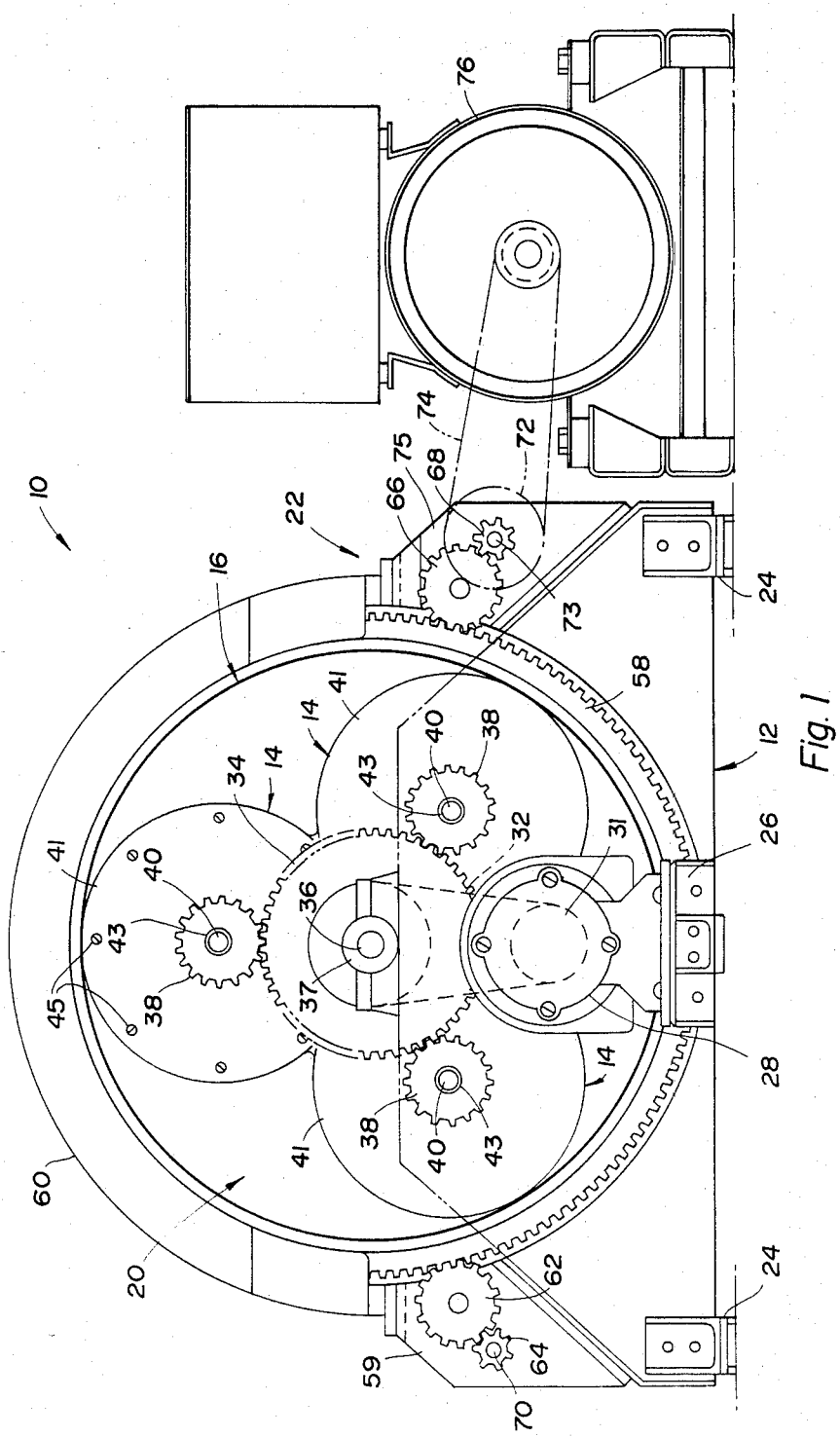
FIG. 1 is a rear elevational view of a mass accelerator and power converter unit constructed in accordance with the present invention coupled to an AC generator.

Referring to FIG. 1 a mass accelerator and power converter unit constructed in accordance with the present invention is generally indicated by reference numeral 10. The unit 10 generally includes a base assembly or support structure 12 and a plurality of substantially identical cylindrical housings 14 in which a like plurality of masses rotate as will be described in greater detail hereinafter. It is to be understood that the invention can be utilized with two or more housings and rotating masses.

Figure 3:
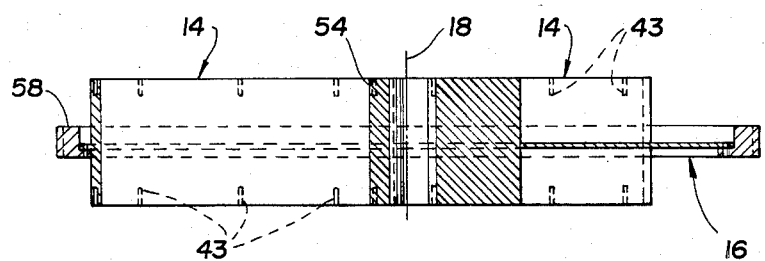
FIG. 3 is a sectional view taken along line 3—3 of FIG. 2 with the various internal moving parts removed to illustrate other components of the present invention.

The unit 10 generally includes a wheel 16 which interconnects the housings 14 to rotate about a main rotational axis as shown in FIGS. 3 at 18. A drive means or mechanism generally indicated at 20 is coupled to the masses within the cylindrical housings 14 to supply rotational power to the masses. A driven means or mechanism, generally indicated at 22 is coupled to the wheel 16 to rotate therewith for withdrawing rotational power from the wheel 16.

Figure 2:
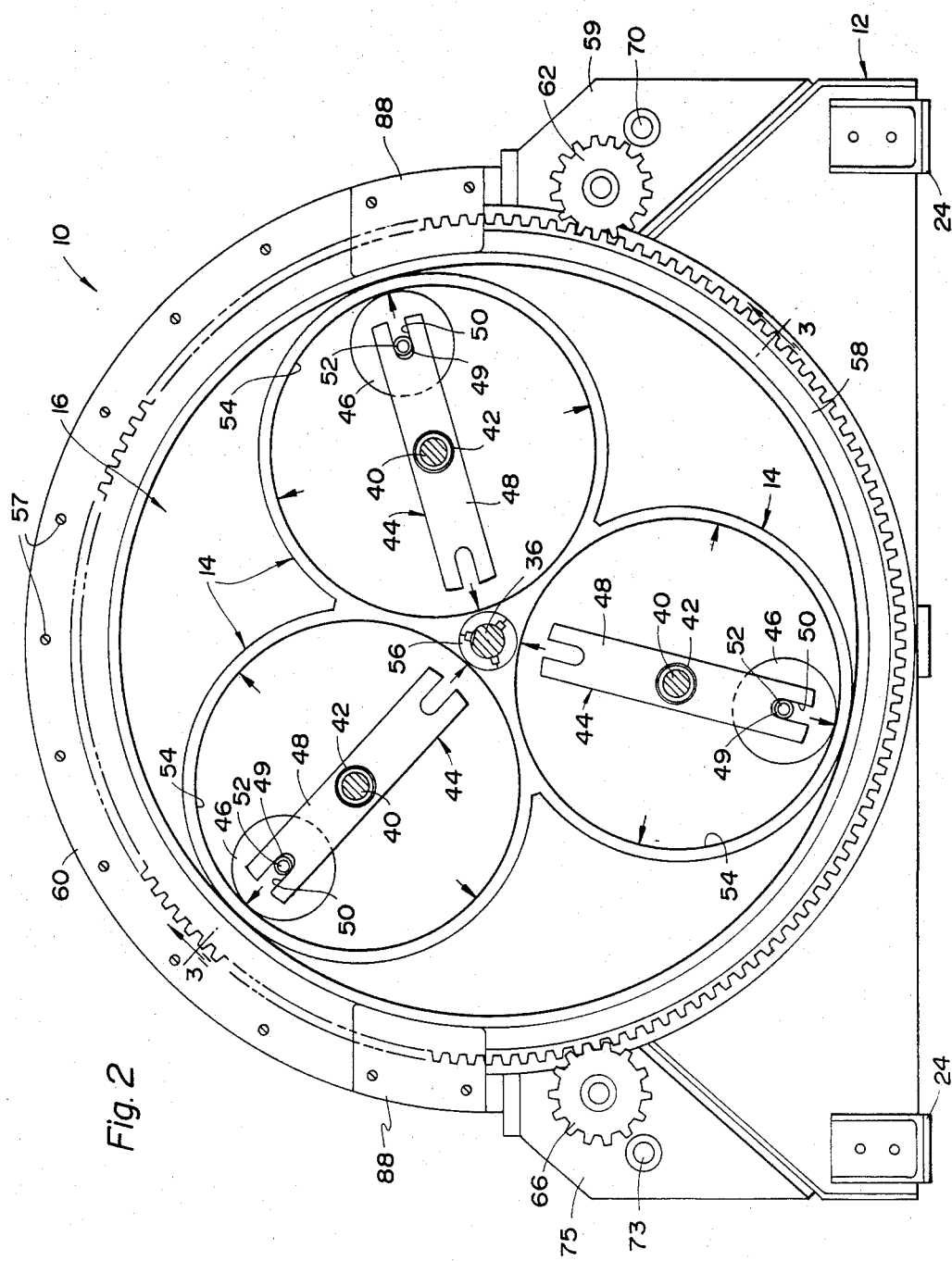
FIG. 2 is an enlarged front view, partially in cross-section of the unit of FIG. 1 with the front parts of the unit removed, without the AC generator and partially rotated.
Figure 5:
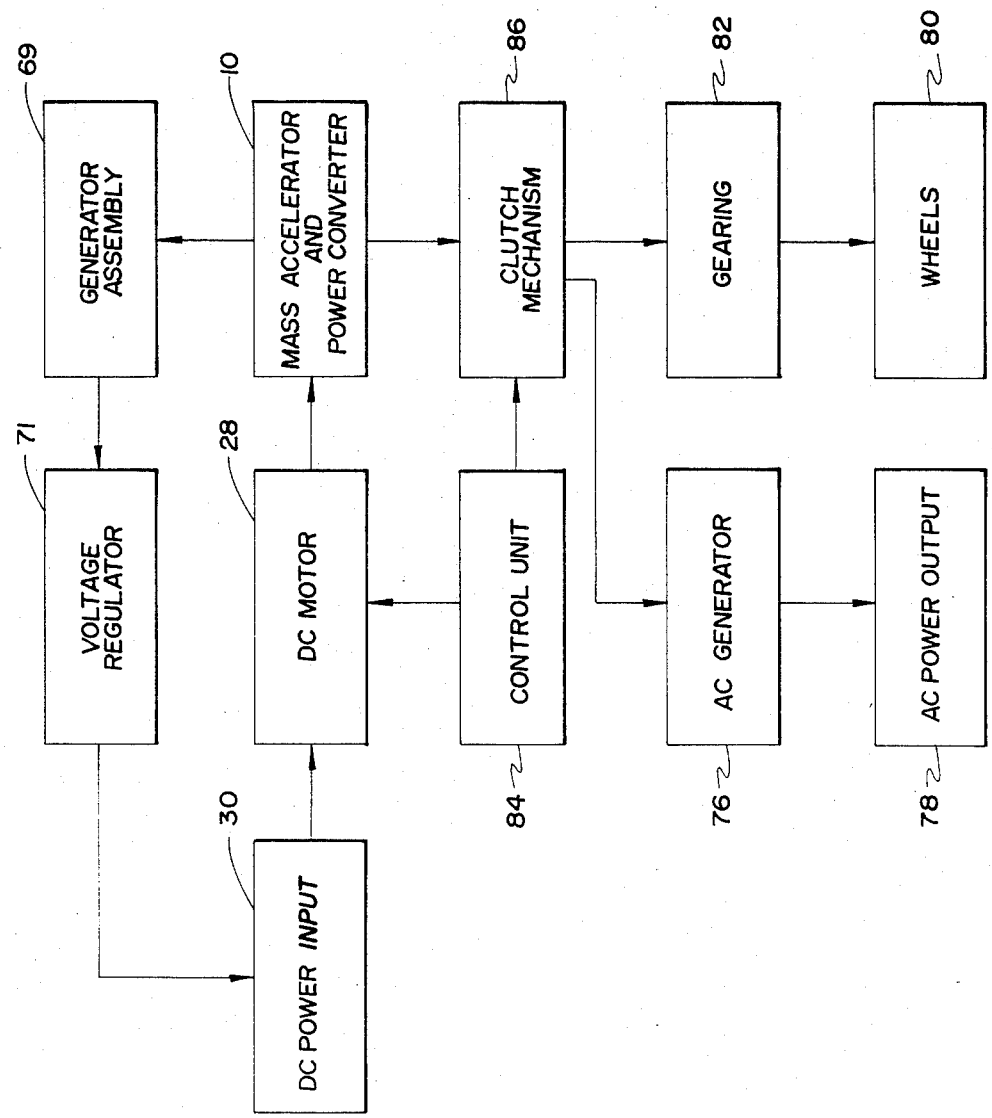
FIG. 5 is a schematic diagram showing in block diagram form a system for utilizing the unit.

With reference to FIGS. 1 and 2, the support structure 12 supports the unit 10 to permit the rotation of the various shafts and gears as will be described in greater detail hereinafter. The support structure 12 is supported on legs 24. A bracket assembly or motor support 26 of the support structure 12 supports a motor, such as a 12-volt DC electric motor assembly 28. The DC motor 28 is powered by a battery such as a rechargeable 12-volt DC battery as indicated at 30 in FIG. 5.

The DC motor 28 includes a timing gear assembly 31 mounted on the output shaft of the motor 28 to rotate therewith. The assembly 31 drives a timing belt, indicated in phantom at 32, which, in turn, drives a second timing gear assembly 34 which is rotatably mounted on a central drive shaft 36 by means of ball bearings 35 and which synchronizes the rotation of each of the gears 38. The drive shaft 36 extends along the main axis 18.

Figure 4:
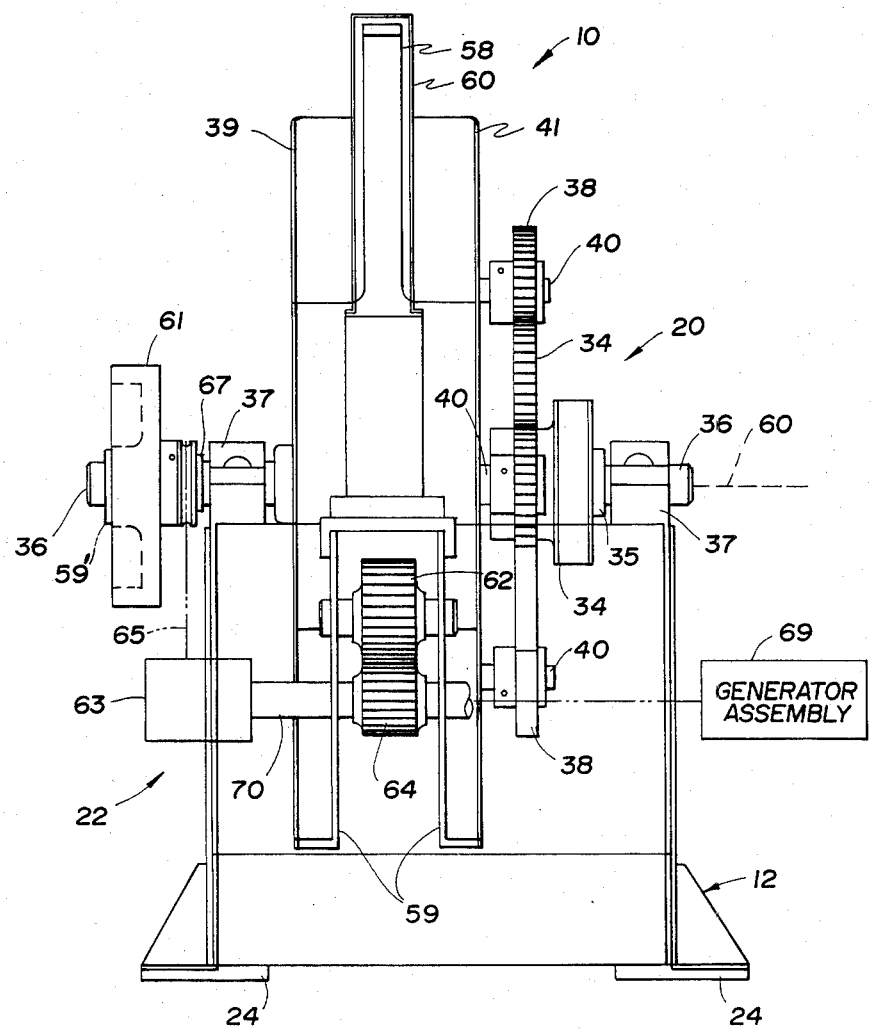
FIG. 4 is a side elevational view partially in schematic form of the unit partially broken away and partially rotated on the support structure from the positions shown in FIGS. 1 and 2.

The wheel 16 is mounted on the drive shaft 36 to rotate therewith. In turn, the drive shaft 36 is rotatably supported at its opposite ends of the frame structure 12 as shown in FIG. 4 by pillow block or roller bearing assemblies 37.

The teeth of the gear assembly 34 drivingly engage the teeth on gears 38. The gears 38 are arranged about the periphery of the gear assembly 34 at an angle of approximately 120° from each other. Each of the gears 38 is fixedly mounted on its own individual drive shaft 40 along axillary drive axes. The shafts 40 extend parallel to and are equidistant from the main drive shaft 36. The shafts 40 are rotatably supported between front and rear cover assemblies 39 and 41 respectively, by means of front and rear ball bearing assemblies 42 and 43, respectively. The cover assemblies 39 and 41 are mounted to the housings 14 such as by screws 45 (only five of which are shown in FIG. 1) at screw-attachment locations as shown in FIG. 3.

Fork or guide assemblies generally indicated at 44 in FIG. 2 are mounted on their respective shafts 40 to rotate therewith. In turn, the assemblies 44 rotatably support and guide their respective masses which preferably comprise substantially identical spherical weights 46. Each assembly 44 includes substantially identical upper and lower elongated arms (only the top one of which is shown at 48) which are separated by a spacer member (not shown), which is preferably formed integral with the shaft 40. Each of the arms 48 is symmetrical about its shaft 40 and is fixedly mounted thereto. Integrally formed pin portions 52 of each of the weights 46 are rotatably mounted at one end of the arms 48 by ball bearings 49 which are slidable within their respective slotted grooves 50 to permit the weights 46 to roll about a roll axis apaced apart from the auxlary axis and exert centrifugal force on the inner surface 54 of their respective cylindrical housings 14 upon rotation of the weights 46.

The cylindrical housings 14 are preferably integrally formed together with the wheel 16 out of a light-weight high-strength metal such as a magnesium alloy. This single piece is fixedly mounted on the shaft 36 by means of a key 56.

A ring gear 58 is fixedly mounted such as by screws, about the outer periphery of the wheel 16. A cover or safety shield 60 is mounted to the support structure 12 by screws 57 to prevent any inadvertent contact with the teeth on the ring gear 58.

The ring gear 58, the housings 14 and the wheel 16 together generally comprise a torque wheel assembly which converts the relatively low torque applied to the weights 46 to a high torque at the periphery of the ring gear 58.

A mounting bracket 59 is fixedly mounted on the support structure 12 such as by bolts and supports a gearing assembly including a pair of gears 62 and 64 which are rotatably mounted on the mounting bracket 59 and which are mounted to rotate together with the ring gear 58. The gear 64 is mounted on a supported shaft 70 and is coupled to a flywheel assembly 61 through step-up gearing indicated schematically at 63 located at one end of the shaft 70. The gearing 63 includes a drive pulley (not shown) mounted on an output shaft of the gearing 63 to rotate therewith. The gearing 63 drives the flywheel assembly through the drive pulley and a belt illustrated by dashed line 65. The flywheel assembly 61 is rotatably mounted on the shaft 36 by bearing 67 to rotate independent of the rotation of the shaft 36. A retainer ring 59' holds the flywheel assembly 61 on the shaft 36. The flywheel assembly 61 provides stability to the rotational movement of the ring gear 58.

The opposite end of the shaft 70 is coupled to a generator assembly 69. The assembly 69 may include step-up gearing to obtain the proper RPM. The generated voltage is utilized to help charge the battery 30 after the voltage is first regulated by a voltage regulator 71.

A second gearing assembly including a second pair of gears 66 and 68 are rotatably mounted on a mounting bracket 75 which, in turn, is fixedly mounted to the support structure 12 such as by bolts. The gears 66 and 68 rotate together with the rotation of the ring gear 58. The gear 68 is mounted on a shaft 73 on which a pulley 72 is mounted as shown in phantom in FIG. 1.

The pulley 72 is adapted to drive a chain or belt, also indicated in FIG. 1 in phantom at 74. The belt, in turn, is adapted to drive a generator assembly 76. Alternatively, the gears 66 and 68 may provide rotational power to wheels 80 of a vehicle through a power transmission or gearing 82, shown schematically in FIG. 5.

A control unit 84 may optionally be provided to control the operation of the DC motor 28 and a clutch mechanism 86 to couple the rotational power from the unit 10 to the generator assembly 76 and/or the gearing 82. The portion of the control unit 84 which controls the DC motor 28 may comprise a manual control such as an on and off switch, or may comprise an automatic control responsive to sensed conditions.

A braking assembly 88 is provided about the outer periphery of the ring gear 58 to prevent rotation of the ring gear 58 in one direction and allowing rotation of the ring gear 58 in the opposite direction. The braking device 88 may take the form of ratchet type brake jaws arranged at spaced locations about the outer periphery of the ring gear 58 as indicated schematically in FIG. 2. The braking assembly 88 only allows the ring gear 58 to rotate in one direction and not in the opposite direction.

In operation, the DC motor 28 is powered by a battery 30 to apply a relatively low torque to thereby rotate the weights 46 within their respective cylindrical housings 14. Centrifugal force exerted by the weights 46 at the inner curved surfaces of the cylindrical housings 14 causes the torque wheel assembly comprising the cylindrical housings 14, the integral wheel 16 and the mounted ring gear 58 to rotate to thereby provide a relatively high output torque. Torque amplification is thus achieved. Preferably, the masses rotate at over 1800 RPM. Torque output is dependent upon the RPM and weight of the masses as well as the diameter of the cylindrical housings 14.

Torque energy input requirements do not vary, regardless of the load applied to the unit 10 since there is no direct connection between the load and the motor 28.

The entire torque wheel assembly as well as the weights 46 are balanced about the drive shaft 36 and together function as a torque wheel once set in motion. The rotating structure turns on the pillow blocks 37 in vertical position for stability.

The amount of centrifugal and gravitational force applied by each of the weights 46 on the walls of their respective housings 14 and which contributes to the rotation of the torque wheel assembly obviously varies depending on the instantaneous position of each of the weights 46 within their housings 14. Any tendency of the torque wheel assembly to oscillate is prevented by the braking assembly which only allows the brake wheel assembly to rotate in one direction.

Torque generated by the rotating weights 46 may be withdrawn by the clutch mechanism 86 or directly connected to any mechanical device, such as the wheels 80 through a transmission or a generator such as the generator assembly 76 to produce electricity. The generated torque is also utilized to recharge the battery 30.

While a preferred embodiment of a mass accelerator and power converter unit has been shown and described herein in detail, those skilled in this art will recognize various alternative designs and embodiments for practicing the present invention as defined by the following claims.

What is claimed is:

1. A mass accelerator and power converter unit comprising:
   a support structure;
   a plurality of cylindrical housings having curved inner surfaces;
   a like plurality of masses, each of which is rotatably mounted in its respective cylindrical housing about its respective auxiliary rotational axis to engage the inner curved surface of its respective housing;
   a wheel rotatably mounted on said support structure for rotating about a main rotational axis spaced apart from each of said plurality of auxiliary axes, said wheel interconnecting said cylindrical housings to permit said housings to rotate about said main axis in unison upon rotation of said masses;
   drive means coupled to each of said masses for supplying rotational power to each of said masses; and
   driven means coupled to said wheel for withdrawing rotational power from said wheel, said wheel rotating upon engagement of said rotating masses with their respective housings.

2. The unit as claimed in claim 1 wherein each of said rotational axes are parallel to each other and wherein the auxiliary axes are equidistantly spaced apart from the main axis and from each other.

3. The unit as claimed in claim 1 wherein each of said curved inner surfaces is circular and wherein each of said masses is coupled to said drive means to roll on the inner circular surface of its respective housing.

4. The unit as claimed in claim 1 wherein said drive means includes a like plurality of gears, each of which is mounted to rotate with its respective mass.

5. The unit as claimed in claim 1 wherein said driven means includes a ring gear mounted on said wheel to rotate therewith.

6. The unit as claimed in claim 1 wherein each of said masses includes a spherical weight and said drive means includes a like plurality of guide means, each of said weights being rotatably mounted on its respective guide means to roll on the inner curved surface of its respective housing.

7. The unit as claimed in claim 4 wherein said drive means includes synchronizing means for synchronizing the rotation of each of said gears.

8. The unit as claimed in claim 1 wherein said housings and said wheel are integrally formed together.

9. The unit as claimed in claim 1 including unidirectional braking means operatively connected to said wheel for preventing rotation of said wheel in one direction and allowing rotation of said wheel in the opposite direction.

10. The flywheel as claimed in claim 1 including a flywheel assembly coupled to said wheel to stabilize rotation of said wheel.

11. A mass accelerator and power converter unit including:
    a support structure;
    a torque wheel assembly rotatably mounted on said support structure for rotating about a main rotational axis;
    a plurality of masses having curved outer surfaces, each of which is rotatably mounted on said torque wheel assembly to rotate about its respective auxiliary rotational axis and rotatably mounted to roll about a roll axis spaced apart from said auxiliary rotational axis, each of said masses rolling on a portion of said torque wheel assembly at its curved outer surface;
    torque supplying means coupled to each of said masses for supplying torque to each of said masses, to cause said masses to rotate about their respective auxiliary rotational axes and to roll about its respective roll axis to cause said wheel assembly to rotate about the main rotational axis; and
    torque withdrawing means adapted to be coupled to said torque wheel assembly for withdrawing torque from said torque wheel assembly, said torque wheel assembly rotating upon rotating of said masses.

12. The unit as claimed in claim 11 wherein each of said rotational axes are parallel to each other and wherein the auxiliary axes are equidistantly spaced apart from the main axis and from each other.

13. The unit as claimed in claim 11 wherein said torque wheel assembly includes a like plurality of curved surfaces and wherein each of said masses is coupled to said torque supplying means to roll on its respective curved surface.

14. The unit as claimed in claim 11 wherein said torque supplying means includes a like plurality of gears, each of which is mounted to rotate with its respective mass.

15. The unit as claimed in claim 11 including a gear assembly mounted on said support structure and coupled to said torque withdrawing means to rotate therewith.

16. The unit as claimed in claim 11 wherein each of said masses includes a spherical weight and said torque supplying means includes a like plurality of guide means, each of said weights being rotatably mounted on its respective guide means.

17. The unit as claimed in claim 14 wherein said torque supplying means includes synchronizing means for synchronizing the rotation of each of said gears.

18. The unit as claimed in claim 11 wherein said torque wheel assembly includes a like plurality of interconnected housings in which said masses are rotatably mounted.

19. The unit as claimed in claim 11 including unidirectional braking means operatively connected to said torque wheel assembly for preventing rotation of said torque wheel assembly in one direction and allowing rotation of said torque wheel assembly in the opposite direction.

20. The unit as claimed in claim 11 including a flywheel assembly coupled to said torque wheel assembly to stabilize rotation of said torque wheel assembly.

* * * * *